June 3, 1958  E. J. GALLAGHER, JR  2,836,843
LEVELER
Filed May 7, 1956

INVENTOR.
Edward J. Gallagher, Jr.
BY Victor J. Evans & Co.

ATTORNEYS

United States Patent Office 2,836,843
Patented June 3, 1958

2,836,843

LEVELER

Edward J. Gallagher, Jr., Baltimore, Md.

Application May 7, 1956, Serial No. 583,033

3 Claims. (Cl. 16—44)

This invention relates to stabilizers or self adjusting levelers used particularly in legs of tables such as tables having metal tubular supporting legs with metal discs or bases of desks, stands, cabinets, and the like, of various shapes, and in particular an inverted cup-shaped base having a rim extended around the peripheral edge with a sleeve extended upwardly from the upper surface and with a threaded stud extended through the upper part of the base and threaded into lower ends of table legs or spaced metal discs of various shapes wherein with an unthreaded portion of the stud below the threads slidable the stud becomes a plunger or shaft having a bearing in the cup-shaped base. The plunger shaft is surrounded by a spring, tension according to the load of the object and the number of bearings of the object, article of furniture or other device suspended on the spring. The object will adjust itself to irregular floor surfaces, walks, decks of ships, and the like, the tension of the spring carrying the object with its load and weight, therefore, the plunger seeks its level on irregular surfaces maintaining stability whereby the object will be rigid. The stud or plunger shaft and inner sleeve bearing provides stiffening means and also the cylindrical sleeve 12 and inner sleeve 24 functions as a lubricating cup increasing the flexibility of the spring action whereby the plunger automatically seeks its own level at all times. The object, will therefore, be rigid on surfaces of floors, side walks, decks of ships and the like as the stabilizers compensate for uneven floor surfaces.

Other features and advantages of the invention will appear from the following description taken in connection with the drawing, wherein:

Figure 1 is a side elevational view illustrating the improved object leveling device showing the device attached to the lower end of a leg or the like.

Figure 1:
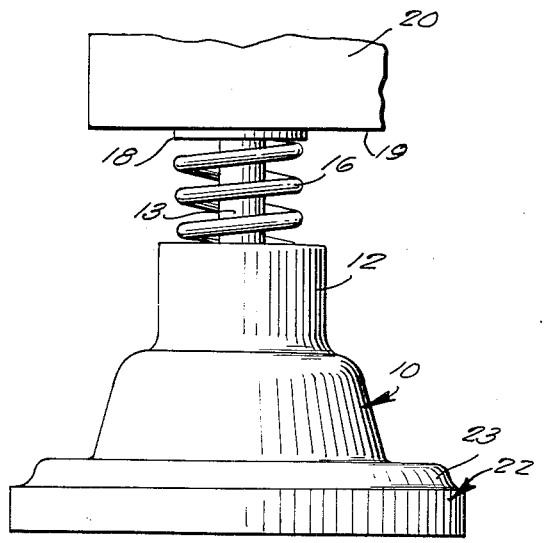
Figure 3:
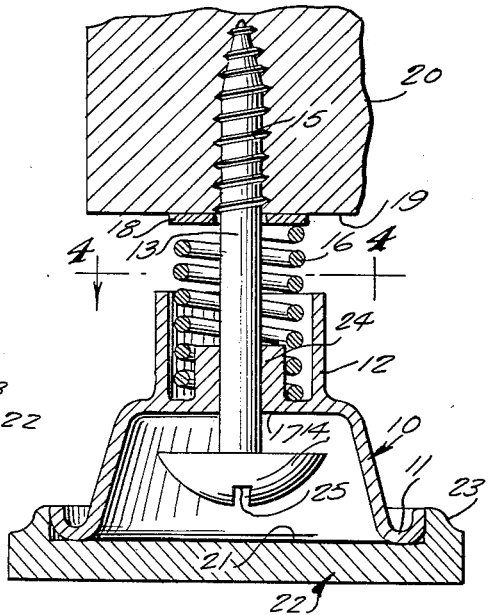
Figure 3 is a view similar to that shown in Fig. 2 illustrating the position of the parts in use wherein the weight of a table or other article of furniture on the device compresses the spring forcing the head of the threaded stud downwardly.
Figure 2:
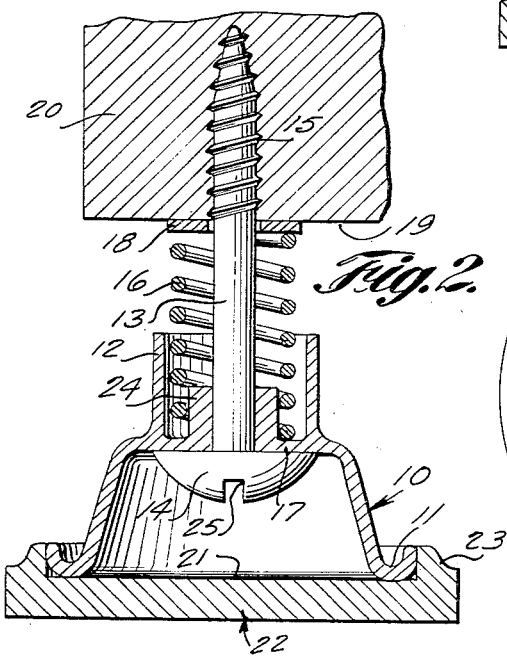
Figure 2 is a vertical section through the device showing the device with the spring in the free position.
Figure 4:
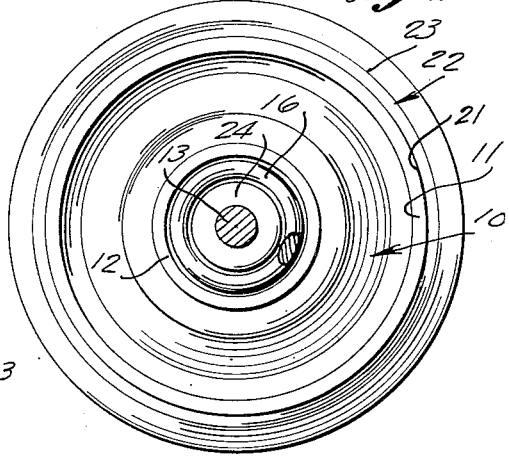
Figure 4 is a sectional plan looking downwardly upon the upper end of the device taken on line 4—4 of Fig. 3, the spring thereof being shown in section.

Referring now to the drawing wherein like reference characters denote corresponding parts the improved self adjustable stabilizer device of this invention includes an inverted cup-shaped base 10 having a rolled lower edge 11 and a cylindrical sleeve 12 extended upwardly from the upper end, a combination plunger and stud shaft 13, the upper end thereof forming a lag screw 15 and the lower end being provided with a head 14 in which a screw driver slot 25 is provided. The inner upper end of the cap is supported and held on the head 14 of the shaft 13 with the lag screw threaded into wood or metal of a leg 20, the size of the screw head 14 depending upon the load of the object and also the size of the spring. The tension of the spring is figured according to the number of stabilizers, the weight of the object being divided accordingly. The spring 16 is extended around the shank of the shaft of the plunger 13 which has its upper part 15 threaded into the metal or wood to which the plunger is fastened. The spring is positioned between the upper end 17 of the base 10 and a washer 18 positioned against the lower surface 19 of a leg or base 20 of an article of furniture.

The central portion of the upper end 17 of the base is turned upwardly providing an inner sleeve 24 and the area between the sleeves 12 and 24 provides a lubricating well, with the sleeve 24 providing a bearing stiffener shank for the plunger shaft 13, increasing the rigidity and also, when moving objects of furniture over floor surfaces provides stabilizing means.

Furthermore, the plunger shaft 13 is free to slide according to the weight of objects or furniture governed by the tension on each spring, the plunger shaft sliding downwardly with each seeking its necessary pressure. The length of the plunger shaft is self adjusting, finding its floor bearing level thereby providing rigidity in its stabilizer.

As a precaution to safeguard highly polished floors, rugs, or delicate furniture the caps 22 may be used by inserting the stabilizer in the recess 21.

With the leveler designed and assembled as shown and described a stud is threaded into lower ends of legs of tables and other parts of furniture and the like and by adjusting the position of the screw or stud of each leg the table top may be made absolutely level. Should conditions change such as wood of an article of furniture expanding or contracting it is only necessary to remove the member 22 and adjust the position of the stud with a screw driver in a slot 25 in the head 14 of the stud.

It will be understood that modifications, within the scope of the appended claims, may be made in the design and arrangement of the parts without departing from the spirit of the invention.

What is claimed is:

1. A leveler for objects comprising an inverted cup-shaped base having an upper flat end, an outer sleeve extended upwardly from said upper end, a stud with a threaded upper end extended through the upper end of the base and the sleeve, a head on said stud within said base and engaging the undersurface of said upper end to retain said stud in said base and a spring extended around the stud and positioned between the upper end of the base and the lower surface of an article of furniture into which the stud may be threaded.

2. In a leveler for use on lower ends of legs of furniture and the like, which comprises an inverted cup-shaped base having a rolled lower rim and a flat upper end, an outer sleeve extended upwardly from said upper end, the upper end of the base also having an inner sleeve also extended upwardly therefrom, a lag screw having a head with a screw driver slot on the lower end and having a threaded upper end extended through the inner sleeve of the base, and a spring extended around the lag screw and positioned with the lower end between the inner and outer sleeves of the base and with the upper end extended upwardly from said sleeves.

3. A leveler comprising an inverted cup-shaped base having a rolled annular rim, and a flat upper end, having a central opening therein, an outer sleeve on said upper end, an inner sleeve on said upper end within said outer sleeve contiguous with and circumjacent to the opening in said upper end, a stud having a threaded end extended through the inner sleeve on the upper end, a head on said stud engaging the undersurface of said upper end within said base, and a spring positioned intermediate of the sleeves and extended upwardly therefrom.

References Cited in the file of this patent

UNITED STATES PATENTS

| 2,145,037 | Bennett | Jan. 24, 1939 |
| 2,761,718 | Tool | Sept. 4, 1956 |

FOREIGN PATENTS

| 1,606 | Great Britain | June 22, 1861 |
| 293,478 | Italy | Feb. 23, 1932 |